US006665549B1

(12) United States Patent
Reed

(10) Patent No.: US 6,665,549 B1
(45) Date of Patent: Dec. 16, 2003

(54) SYSTEM THAT PROVIDES REPLENISHMENT SERVICE FOR POWER SOURCES USED BY MOBILE DEVICES

(75) Inventor: John Douglas Reed, Arlington, TX (US)

(73) Assignee: Motorola, Inc., Schaumburg, IL (US)

( * ) Notice: Subject to any disclaimer, the term of this patent is extended or adjusted under 35 U.S.C. 154(b) by 408 days.

(21) Appl. No.: 09/591,648

(22) Filed: Jun. 10, 2000

(51) Int. Cl.[7] .................................................. H04B 1/38
(52) U.S. Cl. ...................... 455/573; 455/572; 455/575.1
(58) Field of Search ................................... 455/573, 574, 455/575, 572; 320/162; 340/636

(56) References Cited

U.S. PATENT DOCUMENTS 5,689,825 A * 11/1997 Averbuch .................... 455/89
5,844,400 A * 12/1998 Ramsier ..................... 320/106
6,256,520 B1 * 7/2001 Suzuki ....................... 455/572
6,321,078 B1 * 11/2001 Menelli ...................... 455/407
6,323,755 B1 * 11/2001 Lee et al. ................... 340/636
6,323,775 B1 * 11/2001 Hansson ..................... 340/636

* cited by examiner

*Primary Examiner*—William Trost
*Assistant Examiner*—Brandon Miller
(74) *Attorney, Agent, or Firm*—Charles W. Bethards; Steven A. May

(57) ABSTRACT

A system (10) alerts mobile devices (12) that are powered by replenishable power sources (14). A communications link is established between a replenishment service provider and the mobile devices (12). The replenishment service provider alerts the mobile devices (12) as to the availability of one or more replenishment services within a service area.

35 Claims, 3 Drawing Sheets

SYSTEM THAT PROVIDES REPLENISHMENT SERVICE FOR POWER SOURCES USED BY MOBILE DEVICES

FIELD OF THE INVENTION

The present invention in general relates to the field of communication systems and more particularly to replenishing power sources of mobile devices that operate within such systems.

BACKGROUND OF THE INVENTION

Most portable or small mobile devices, such as wireless phones, Personal Data Assistant (PDA's), portable computers, etc., are powered by power sources that store a limited amount of energy for powering such devices. Examples of such power sources include various forms of batteries, or perhaps someday fuel cells that utilize a cartridge of some form of fuel. Because of their limited life, these type of power sources must be replenished by replenishing devices. Replenishing devices include battery chargers, battery dispensers, perhaps someday fuel cartridge dispenser, etc. Yet, because of the rapid pace of modern lifestyles, users of portable devices often forget to replenish the power sources when required. Currently, the users of replenishable energy sources are alerted to a low energy condition by warning indicators on the device. One such warning indicator notifies the user of a battery-powered device of the energy status in the battery via an audio or visual alert. Other warning indicators include displays disposed on the portable devices that provide graphical representation of the stored energy.

A problem with the current warning system is that the users often notice that the stored energy is getting low or is nearly depleted when they are at a location away from a replenishing device. Hence, by the time a user returns to a location where replenishing could be performed, the power source may have been fully depleted, rendering the powered device inoperable. Therefore, there exists a need for a system that alerts the users of rechargeable or replenishable power sources of the availability of replenishing devices, for example, within proximity, so that they can reach a replenishing device, before the energy stored in the power sources is depleted.

DETAILED DESCRIPTION OF THE PREFERRED EMBODIMENT

Figure 1:
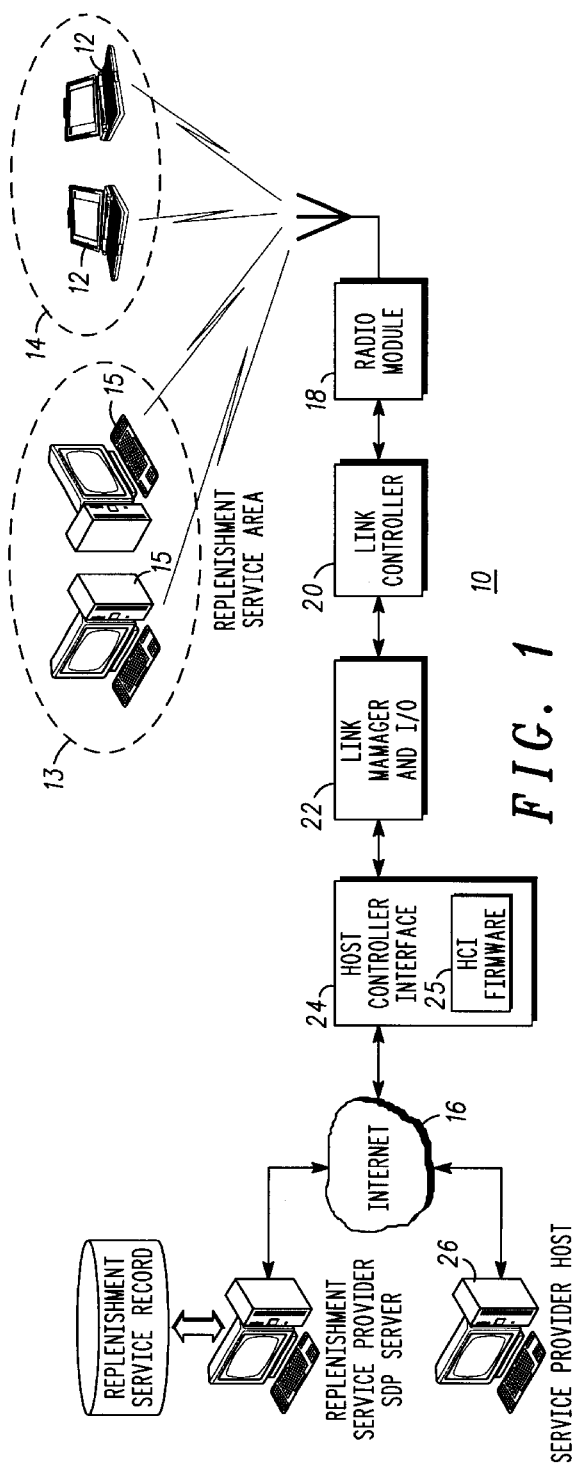
FIG. 1 is a block diagram of an exemplary system that advantageously utilizes an embodiment in accordance with the present invention.

The present disclosure relates to alerting a mobile device powered by a replenishable power source of the availability of a replenishment service. As herein defined, a replenishment service is provided by any entity that can perform a power replenishment function for replenishing the energy stored in a power source. According to one aspect, a communications link is established between the mobile device and a replenishment service provider that provides replenishment service within a coverage area. In one exemplary embodiment, the replenishment service provider may be incorporated into a communications network. In another embodiment the replenishment service provider may be a replenishing device itself. In accordance with the invention, the replenishment service provider alerts the mobile device of the availability of the replenishment service within the coverage area.

A replenishable power source may be any power source that has a finite stored energy that needs to be replenished when the energy is depleted. For example, the replenishable energy source may be a single use battery (sometimes called a primary cell), a rechargeable battery (sometimes called a secondary cell), a fuel cell, a replaceable battery, certain types of energy storage devices which may include capacitors, etc. A replenishing device may be any device that is capable of replenishing energy to a replenishable power source. As such, the replenishing device can be a battery charger, battery dispenser, someday a fuel cartridge dispenser or any other suitable device. The replenishment of the power source can be accomplished by exchanging a fully replenished power source for a depleted power source. For example, the exchange may involve a depleted battery or cartridge being traded for a new or freshly replenished battery or cartridge.

According to some of the more detailed features, the mobile device transmits its location information to the service provider. Based on the received location information of the mobile device, the service provider transmits location information relating to a replenishing device or replenishment service to the mobile device. The mobile device location information or the replenishing device location information may be obtained from a positioning service, for example a Global Positioning System (GPS). Alternatively, the service provider may determine the location information using well-known positioning techniques, such as proximity to one or more base stations, measured by signal strength, angle of arrival, or propagation delay. Time of arrival, time difference of arrival, or other methods well-known in the art are additional examples.

Further, the mobile devices may be assisted with directional support for finding the location of the available replenishing devices or replenishment services. In one embodiment, based on the mobile device location information, the service provider may provide directional support, for example, in the form of a map or textual display relating to the direction for reaching the available replenishing devices or services. Alternatively, a directional device, such as a compass that is incorporated into the mobile device, may assist in indicating directions to a replenishing device or replenishment service location in response to location information received form the service provider.

According to another aspect of the invention, the communications network that incorporates the replenishment service provider may be a wireless communications network that operates under a predefined network protocol, such as that defined by Bluetooth specification. Such a wireless communication network may be a traditional or an ad-hoc network. Under this arrangement, the mobile devices may transmit a replenishment service request to the communications network requesting the replenishment service. In one embodiment, based on a replenishment service request from the mobile device, the service provider may provide location information for replenishing devices. In another embodiment, the mobile device may transmit its own location information along with the request. Based on the mobile device location information, the service provider may inform the mobile device of the availability of replenishing devices or services within a service area. For example, a mobile device at a location (A) may be informed of the availability of replenishing devices or replenishment services within the coverage areas of (B) or (C) of one or more communications networks.

According to other more detailed features in accordance with the invention, the mobile device may transmit the service request based on one or more predefined criteria. For instance, the mobile device may monitor the remaining energy level against a threshold and transmit the service request, when the remaining energy drops below the threshold. Each criterion may be preset at the mobile device. Alternatively, the user may set the criterion based on a desired user parameter.

The service request transmitted from the mobile device may also include replenishing device-related attributes that allow the service provider to determine whether a compatible replenishment service is available for the mobile device. Alternatively, the service request may include a request for a defined replenishing device or replenishment service attribute that is transmitted from the mobile device to the service provider. Replenishing device or replenishment service attributes could include the replenishing service type, the electrical connector used, brand, style, type, voltage, chemical makeup, recommended replenishing method, current power state, and size or capacity of the power source that is in use or additional attributes of the devices. The mobile device can then be alerted when an available replenishment service corresponds to the requested replenishing device or service attributes.

In still further details of the invention, a service provider may broadcast the availability of a replenishment service to the mobile devices. Either one or both of the communications network or a replenishing device may initiate the replenishment service broadcast to inform the mobile devices within proximity of the availability of the replenishment service. The replenishment service broadcast may include such service attributes as cost for use, type, status, available times for replenishing, estimated time required to replenish and replenishing device location. The mobile device may be alerted only if one or more broadcast replenishment service attributes, such as cost for use, meet selected thresholds. In one embodiment, a threshold associated with the use of the replenishment service may be user-selectable, or it could be preset at the mobile device. In another embodiment, the replenishment service provider, be it the network or the replenishing devices, may establish communications with a billing network for tolling and billing users for the use of the replenishing devices or services.

According to yet another aspect of the invention, the locations where the power source has previously been replenished is stored in a database. The database may be accessible by a communications network or, alternatively, may be stored within the mobile device. When a mobile device replenishes its power source, the location of the mobile device is determined and stored in the database. When the remaining energy in the mobile device is below a threshold, the proximity between the mobile device and a previous replenishing location is determined. This proximity is based on the location of the mobile device as compared to the stored previous replenishing location. The mobile device can then be alerted when it is in some set proximity of the replenishing device location. The set proximity may be a user-selected value or pre-set at the device.

According to another aspect of the invention, the mobile device may first detect a need to replenish the power source. The device can communicate with the network to establish its current location and compare this location to a set of stored locations within the mobile device, where the replenishable power source has been replenished previously. Alerting the mobile may include a number of methods to get the attention of the user, including: a visual or audio indicator, a vibration alert, a modified ring or dial-tone, etc. In addition to the various methods to alert the user, a message may be sent through the network to another device, such as a computer, or a display device, or to another user, such as an administrative assistant, etc. The mobile device can then be alerted when the current location of the mobile device is within a predefined distance from the stored location of a replenishing device or service, where the replenishment was previously performed.

The present invention also relates to a mobile device that receives available replenishment service attributes. A controller compares the available replenishment service attribute with required replenishment service attributes of the mobile device. Based on the comparison, the mobile device user is alerted as to the availability of the replenishment service. The mobile device may also include a transmitter that transmits a replenishment service request in response to determination of a need to replenish the replenishable power source. Under this arrangement, the mobile device includes a detector for detecting the need to replenish the replenishable power source.

A method in accordance with the present invention involves receiving available replenishment service attributes and determining whether there is a match between at least one available replenishment service attribute and at least one required replenishment service attributes of the mobile device. Based on such determination, the method of the invention alerts the mobile device of the availability of the replenishment service.

Referring to FIG. 1, a system 10 that takes advantage of various principles of the present invention is shown. The system is preferably implemented over a communications network that provides wired or wireless links for one or more mobile devices 12 that operate within a coverage area 14. One such wired communications link is provided over the Internet 16, which is a collection of interconnected (public and/or private) networks that are linked together by a set of standard protocols (such as WAP, or TCP/IP) to form a global, distributed network. Various wireless links that support defined protocols may be used in connection with the present invention. Examples of such protocols include those defined by Bluetooth, IEEE 802.11, GSM, IS-136, and IS-95. One or more replenishing devices 15 that may for example, comprise battery chargers, fuel dispensers, etc. are used to provide replenishment services in accordance with the present invention. As shown, the replenishing devices 15, which may be equipped to wirelessly communicate with the system in a stationary or mobile positions, and may be scattered within one or more service areas 13.

In the preferred embodiment, the system 10 is implemented based on the Bluetooth System, as disclosed in Specification of the Bluetooth System (v1.B Dec. 1$^{st}$ 1999), which is hereby incorporated by reference. Although Bluetooth is well understood the operation of one such system is described to the extent necessary for the understanding of the present invention. Generally, a Bluetooth system provides short-range radio links over an unlicensed ISM band within which information is communicated using shaped binary frequency modulation to provide an information symbol rate of 1 Ms/s. The Bluetooth system uses slotted channels in the form of time slots. On each channel, information is exchanged through packets that are transmitted on different hopping frequencies. A packet nominally covers a single slot, but can be extended to cover up to five slots.

Two or more devices that share the same channel form a piconet, and multiple piconets with overlapping coverage areas form a scatternet. One device acts as the master device of the piconet, whereas the other devices may act as slave device(s). Thus, each piconet can only have a single master device. However, slave devices can participate in different piconets on a time-division multiplex basis. In addition, a master device in one piconet can be a slave device in another piconet.

As shown in FIG. 1, the system 10 consists of a radio module 18, a link controller 20, and a link manager 22 that interfaces with a host controller interface (HCI) 24. The radio module 18 operates in the 2.4 GHz band to provide the physical medium over which mobile devices 12 communicate with the system 10. The band has a 83.5 MHz width that contains 79 RF channels that are spaced 1 MHz apart from each other. Each channel is represented by a pseudo-random hopping sequence through the 79 RF channels. The hopping sequence is unique for each piconet and is determined by the device address of a corresponding master device, with the clock of the master device setting the phase in the hopping sequence.

The link controller 20 carries out the baseband protocols and other low-level link routines and includes hardware and software parts that perform baseband processing and manage physical layer protocols as well as ARQ-protocol and FEC coding. The link controller 20 controls two types of links: Synchronous Connection-Oriented (SCO) links, and Asynchronous Connection-Less (ACL) links. The SCO link, which typically supports time-bounded information like voice, is a point-to-point link between a master device and a single slave device in a piconet. A master device can maintains up to three SCO links to the same slave device or to different slave devices using reserved slots at regular intervals that form circuit-switched like connections. A slave device can support up to three SCO links from the same master device or two SCO links if the links originate from different master devices. Because SCOs are synchronous links, they do not support packet transmissions.

In contrast, the ACL link is a point-to-multipoint link that supports packet transmissions. An ACL link is established between a master device and all slave devices that participate on a piconet. In the slots not reserved for the SCO link(s), the master device can establish an ACL link on a per-slot basis to any slave device, including the slave device(s) already engaged in an SCO link. Between a master device and a slave device, however, only a single ACL link can exist. ACL packets not addressed to a specific slave device are considered as broadcast packets and are read by every slave device.

The Host Controller Interface (HCI) 24 provides a command interface to the link manager 22, and access to hardware status and control registers. Using an HCI firmware 25, this interface provides a uniform method of accessing the baseband capabilities. The HCI firmware 25 implements the HCI commands for the system hardware by accessing baseband commands, link manager commands, hardware status registers, control registers, and event registers.

A service provider host 26 utilizes link policy commands controlled by the HCI 24 to manage traffic in a localized network. The localized networks can be, for example, a Bluetooth piconet, and/or scatternet. Other examples of localized networks that utilize the present invention include those specified by IEEE, under standard 802.11, which is hereby incorporated by reference. Several layers may exist between an HCI driver on the host processor 26 and the HCI firmware 25 in the system hardware. These intermediate layers, known as the Host Controller Transport Layer, provide the ability to transfer data without intimate knowledge of the data. HCI events are used for notifying the host processor 26 when something occurs. Once the host processor discovers that an event has occurred, it parses the received event packet to determine the nature of the event. For example, the host processor 26 uses the HCI events to detect a service request that is generated by a mobile device.

Figure 2:
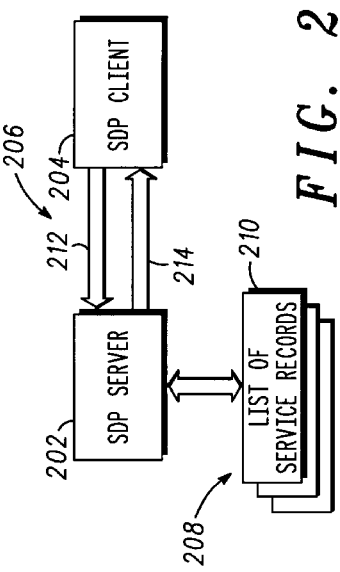
FIG. 2 is a block diagram of a Service Discovery Protocol that provides replenishment service in accordance with one embodiment of the invention.
Figure 8:
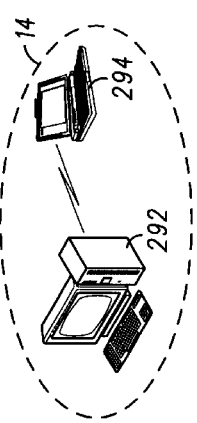
FIG. 8 is a block diagram of a system, wherein a replenishing device provides replenishment service in accordance with another embodiment of the invention.

Referring to FIG. 2, a block diagram for supporting a Service Discovery Protocol (SDP) in the system of FIG. 1 is shown. The SDP defines the protocol for locating available services provided by or available through a service provider. The SDP provides for the discovery by a client application of a server application and the attributes of those services contained in the service records maintained by the SDP server. For providing the replenishment service, a replenishment SDP server 202 and a mobile SDP client 204 communicate 206 with each other. Under one embodiment in accordance with the present invention, the replenishment service is provided over a communications network. In another embodiment depicted in FIG. 8, a replenishing device suchas devices 15 may execute the replenishment SDP server 292, and the mobile device may execute the SDP clients 294. Under this arrangement, the replenishing device acts as a master device in the piconet and the mobile device requesting replenishment service acts as a slave device. It should be noted however, that under the present invention a Bluetooth enabled replenishing device might function both as an SDP server and as an SDP client.

The SDP server 202 maintains a list 208 of service records 210, in a database, that uniquely describe the characteristics of the service associated with the server, including the replenishment services. For example, in connection with the replenishment service, the corresponding service record contains information, for example, on attributes like cost, type, status, available times for replenishment, estimated time required to replenish and replenishing device location for each replenishing device or group of replenishing devices. In this way, a mobile device acting as a slave and running client 204 may retrieve information from the service records 208, 210 maintained by the SDP server 202 by issuing an SDP request 212. In the case of an SDP Service Search request, an SDP Service Search response 214 is returned with an SDP response providing a list of all available services that meet the search pattern provided in the request. As stated before, a single device may function both as an SDP server and as an SDP client. If multiple applications on a device provide services, an SDP server may act on behalf of those service providers to handle requests for information about the services that they provide. Similarly, multiple client applications may utilize an SDP client to query servers on behalf of the client applications.

The set of SDP servers that are available to an SDP client can change dynamically based on the RF proximity of the servers to the client. When a server becomes available, a potential client must be notified by a means other than SDP so that the client can use SDP to query the server about its services. Similarly, when a server leaves proximity or becomes unavailable for any reason, there is no explicit notification via the service discovery protocol. However the client may use SDP to poll the server and may infer that the server is not available if it no longer responds to requests.

Figure 3:
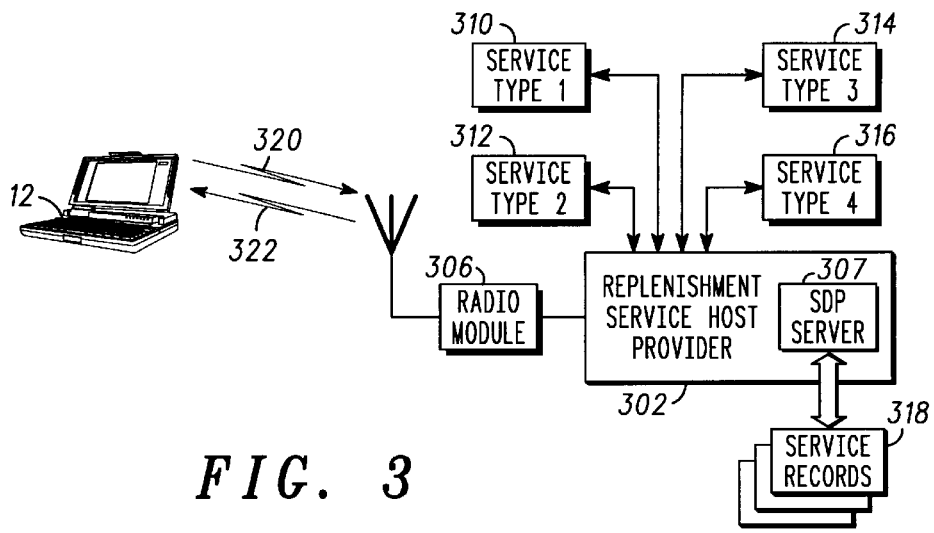
FIG. 3 is a block diagram of a Bluetooth enabled system implementing an exemplary embodiment in accordance with the invention.

FIG. 3 shows a Bluetooth-enabled mobile device that communicates with a replenishment service provider incorporated within the system of FIG. 1. Under the control of a host 302, the service provider communicates with the mobile device 12 via a Bluetooth radio module 306 that is coupled to an SDP server 307. The SDP server 307 is informed of the replenishment services that are provided within the service area by a database of service records 318. The replenishment service may be provided by various replenishing devices having various attributes, identified as Service Types 1–4 in FIG. 3. Type 1 service 310 may be a battery charger service for one type of mobile units. Type 2 service 312 may be a charger service for another type of mobile unit. Type 3 service 314 may be an exchange service that replaces a depleted power source with a power source with a higher stored energy level. Type 4 service 316 may be a rental service for replenishing power sources, where batteries for example are rented for a service charge. The service records 318 contain the attributes of various replenishment services provided by the service provider. As stated before, Bluetooth-enabled replenishing devices acting as masters themselves may be service providers, with attributes relating to the replenishment service offered by the master device being stored in an internal service record storage device.

When requiring a replenishment service, the mobile device 12 acting as a client searches for a replenishment service by issuing specific search patterns that are sent in a replenishment service request 320. In one embodiment of the invention, when the stored power for operating the mobile devices drops below a threshold, the mobile device 12 begins to search for available power replenishment services. The replenishment service host responds with a replenishment service response 322, which includes the attributes from the service records 318 stored in the SDP server. As can be seen, the replenishment service of the invention is provided by a combination of hardware and software that provide information about replenishment service, perform the replenishment function, or control the replenishing devices or resources.

Figure 4:
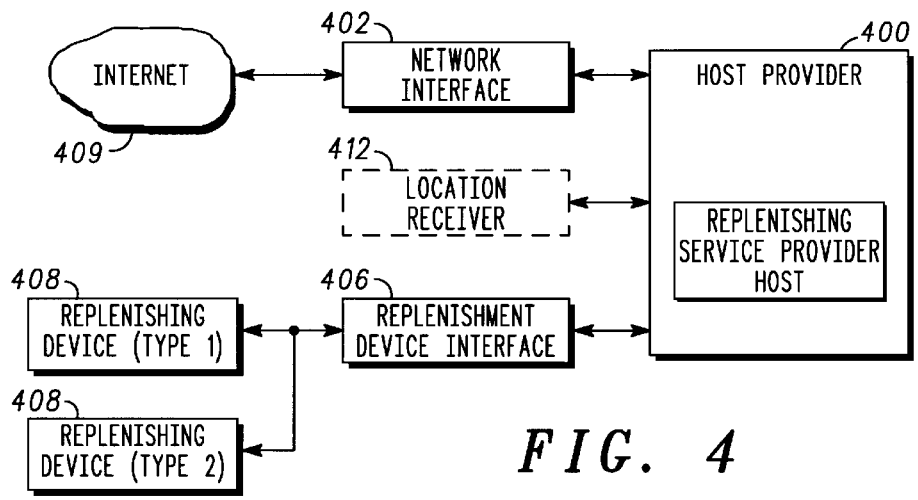
FIG. 4 is a block diagram for a replenishment service provider in accordance with one embodiment of the invention.

Referring to FIG. 4, a block diagram of a replenishment service provider host 400 for providing the replenishment service in accordance with the exemplary system of FIG. 3 is shown. The host 400 uses a network interface 402, such as an Ethernet interface, to interface for example with other networks over the Internet 409. In this way, the replenishment service provider may have access to other services or databases to perform billing, message processing, location information processing, etc. The host 400 interfaces with the radio module 306 for receiving replenishment service requests from the mobile devices 12 in the manner described above. A replenishing device interface 406 allows the host to interface and identify the attributes or functionality of available replenishing devices 408 that may be offered by the service provider. Optionally, a location receiver 412 may provide location information relating to the position of the replenishing devices within 408 the service area. For example, using the GPS, the position of the replenishing devices 408 may be conveyed to the replenishment service provider host from time to time, in case the replenishing devices do not remain stationary.

Figure 5:
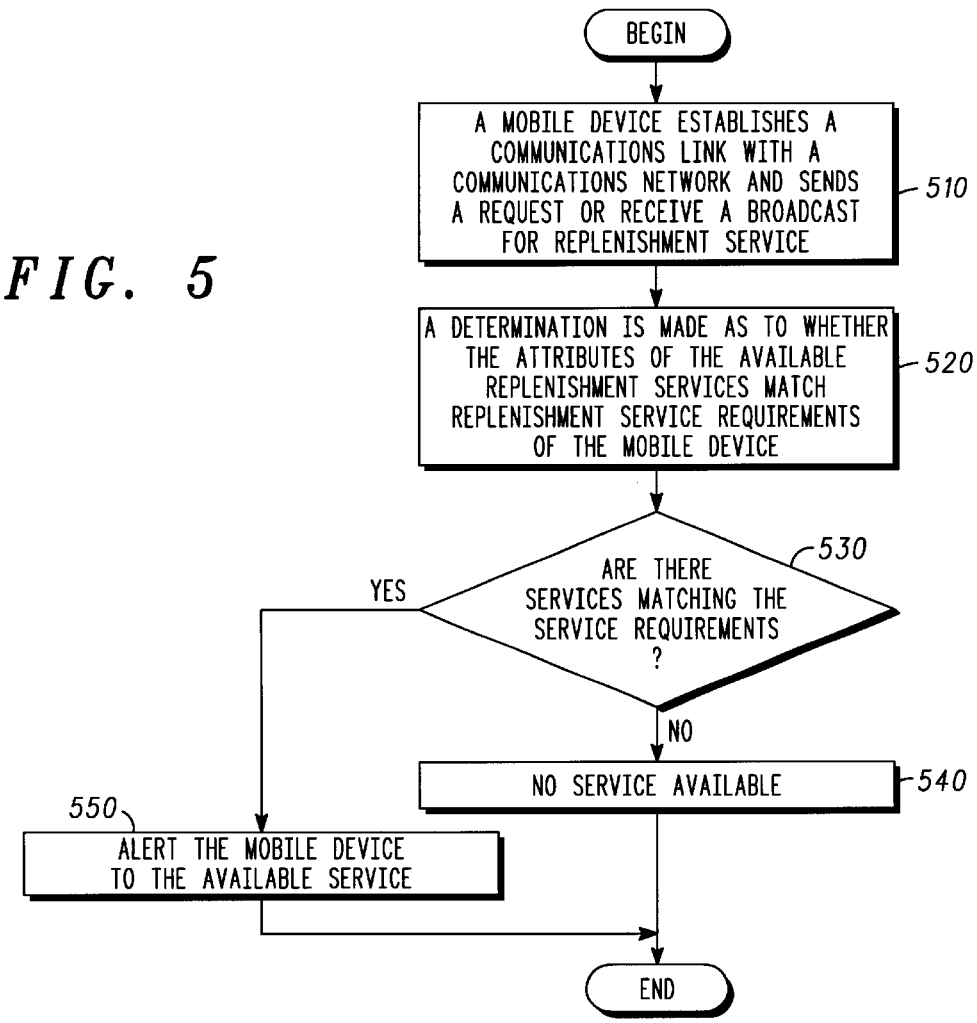
FIG. 5 is a flow chart illustrating the steps for implementing one method embodiment in accordance with the invention.

FIG. 5 shows a flow chart for alerting the mobile devices in accordance with the present invention. A mobile device establishes a communications link with a communications network or a service provider by sending a request or receiving a broadcast for an available replenishment service 510. After establishing communications with the communications network or service provider, a determination is made as to whether the attributes of the available replenishment services match the attributes of a required replenishment service by the mobile device, with such determination being made in any one of the mobile device itself, the service provider or the communication network, blocks 520 and 530. If there are services available that meet the required replenishment service attributes, the mobile device is alerted 550 of the availability of replenishment service. If there are no services available, the device can indicate this result or simply not be alerted 540.

Figure 6:
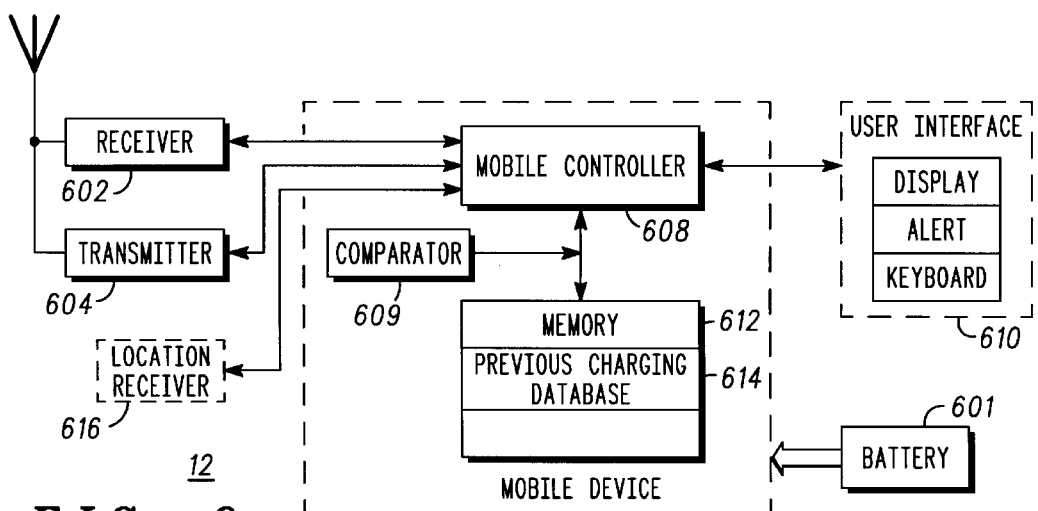
FIG. 6 illustrates a block diagram of a mobile device used in accordance with the invention.

FIG. 6 shows a block diagram of a mobile device 12 that is alerted of the availability of replenishment devices or replenishment services in accordance with the present invention. The mobile device 12, which is powered by a replenishable power source, such as a battery 601, establishes the communication link with the communication network using a receiver 602 and a transmitter 604 that receive and transmit information via an antenna 606 in a well known manner. The mobile device 12 operates under the control of a mobile controller 608 that allows a user to interface with the mobile device 12 via a user interface 610 that, for example, includes a display or an input device such as a keyboard. The controller 608 has access to a memory device 612 that stores various information relating to the operation of the mobile device 12.

In accordance with another aspect, the memory device 612 includes a database 614 for storing location information relating to where the mobile device was previously replenished. Once a need to replenish the replenishable power source is detected, for example, by detecting whether the mobile device, battery voltage has dropped below a predefined threshold, a comparator 609 compares the current location of the mobile device with stored locations where the replenishable power source was previously replenished. The controller 608 then produces an alert that the current location of the mobile device is within a minimum distance of a stored location. The current location information of the mobile device 12 may be obtained in a well known manner using a location receive 616, such as a GPS receiver.

Figure 7:
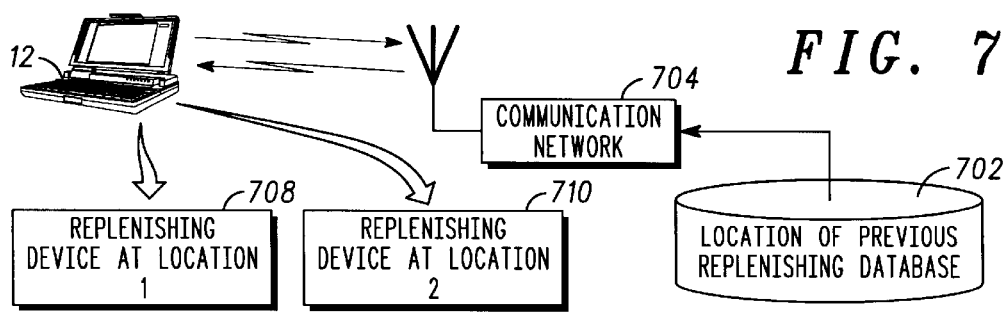
FIG. 7 discloses a block diagram of a system in accordance with yet another embodiment of the invention.

Alternatively, the database storing the previous replenishment locations may be coupled to a communications network and the mobile device 12 may access the replenishment service by communicating with the network. In FIG. 7, a communications network 704 communicates with a database 702 for storing location information relating to where the mobile device 12 was previously replenished. Once a need to replenish the replenishable power source is detected, for example, by detecting whether the battery voltage in the mobile device 12 has dropped below a predefined threshold, the communications network 704 compares the current location of the mobile device 12 with locations stored in the database 702. The controller then produces an alert that the current location of the mobile device 12 is within a minimum distance of a stored location. The current location of the mobile device 12 may be obtained in a well known manner using a location receive, such as a GPS receiver.

In order to avoid obscuring the various aspects of the present invention various details each well within the wherewithal of one of ordinary skill have not been dwelled upon above. For example it is preferable that the methods or apparatus discussed herein will utilize software for its respective functionality. Given the teachings herein it is believed that such software could be readily provided by one of ordinary skill in the field.

In providing these types of service, the invention allows for more fruitful use of increasingly important electronic devices. Users will be able to receive information more reliably, as the devices will be fully powered and functioning more often. Further, retailers will be able to provide additional value added services by providing replenishing stations and the like to consumers. Thus, the advantages to the personal and business user of electronic devices are numerous and far-reaching.

What is claimed is:

1. A communication system that provides services to at least one mobile device that is powered by a replenishable power source, comprising:
   a service provider that provides a replenishment service within a service area, wherein the service provider comprises:
      at least one replenishment device;
      a replenishment server that maintains service records comprising a location of the at least one replenishment device and attributes of the at least one replenishment device; and
   a radio module that establishes a communication link between a mobile device and the service provider, wherein the service provider alerts the mobile device as to the availability of the replenishment service within the service area.

2. The system of claim 1, wherein the replenishment service is provided by exchanging a full power source for a depleted power source.

3. The system of claim 1, wherein the replenishable power source is a fuel cell.

4. The system of claim 1, wherein the replenishable power source is a rechargeable battery.

5. The system of claim 1, wherein the replenishment service is provided by a replenishing device.

6. The system of claim 1, wherein the replenishable power source is a replaceable power source.

7. The system of claim 1, wherein the replenishing device is at least one of a battery charger, battery dispenser, and a fuel cartridge dispenser.

8. The system of claim 1, wherein one of at least one of a replenishing device location information and a mobile device location information is communicated between the mobile device and service provider.

9. The system of claim 8, wherein the at,least one of the mobile device location information and the replenishing device location information is provided by a positioning service.

10. The system of claim 8, wherein a proximity distance between the mobile device and a replenishing device is determined based on the mobile device location information.

11. The system of claim 10, wherein the mobile device is alerted of when the determined proximity distance meets a distance threshold.

12. The system of claim 11, wherein the distance threshold is user selectable.

13. The system of claim 9, wherein directional support is provided for directing the mobile device to a replenishing device location.

14. The system of claim 1, wherein the mobile device transmits a replenishment service request from the mobile device upon satisfaction of a predefined criteria.

15. The system of claim 14, wherein the replenishing device service request includes at least one replenishment device related attribute.

16. The system of claim 15, wherein the replenishing device related attribute includes at least one of a replenishment service type, electrical connector, brand, style, type, voltage, chemical makeup, recommended replenishing method, current energy state, size of power source, and capacity of power source.

17. The system of claim 10, wherein the mobile device is alerted when an available replenishment service corresponds to at least one of a requested replenishment service attribute.

18. The system of claim 14, wherein the predefined criteria relates to a remaining power level in the replenishable power source.

19. The system of claim 18, wherein the predefined criteria is satisfied if the remaining power drops below a user-selectable threshold.

20. The system of claim 1, wherein the replenishment service is broadcast to mobile devices within the service area.

21. The system of claim 20, wherein the replenishment service broadcast includes at least one replenishing device service attribute.

22. The system of claim 20, wherein the replenishing device service attributes include at least one of the following cost, type, available times for replenishing, estimated time required to replenish and replenishing device location.

23. The system of claim 16, wherein the mobile device is alerted only if a broadcast replenishment service cost attribute meets a selected cost attribute threshold.

24. The system of claim 17, wherein the selected cost attributes threshold is user-selectable.

25. The system of claim 1, wherein the service provider is incorporated within a wireless communications network that operates under a predefined network protocol.

26. The system of claim 1, wherein the service provider uses a billing service for billing the user of the mobile device for the use of the replenishment service.

27. A mobile device that is powered by a replenishable power source, comprising:
   a receiver that receives information from a replenishment service provider related to replenishment service attributes of one or more replenishment devices, wherein the replenishment service attributes comprise at least one of a cost, type, available times for replenishing, estimated time to replenish, and replenishing device location; and
   a controller that determines whether one or more of the received replenishment service attributes matches one or more required replenishment service attributes of the mobile device, wherein the controller, based on the determination, alerts a user of the mobile device as to the availability of a replenishment service.

28. The mobile device of claim 27 further including a transmitter that transmits a replenishment service request in response to a need to replenish the replenishable power source.

29. The system of claim 27, wherein at least one of a replenishing device location information and a mobile device location information is communicated between the mobile device and a service provider.

30. The system of claim 28, wherein the at least one of the mobile device location information and the replenishing device location information is provided by a positioning service.

31. The system of claim 28, wherein a proximity distance between the mobile device and a replenishing device is determined based on the mobile device location information.

32. The system of claim 30, wherein the mobile device is alerted of when the determined proximity distance meets a distance threshold.

33. A method of alerting a communication device that is powered by a replenishable power source, comprising the steps of:

receiving information from a replenishment service provider related to replenishment service attributes of one or more replenishment devices, wherein the replenishment service attributes comprise at least one of a cost, type, available times for replenishing, estimated time to replenish, and replenishing device location;

determining whether there is a match between one or more of the received replenishment service attributes and one or more required replenishment service attributes of the mobile device; and alerting a user of the mobile device as to the availability of replenishment service based on the determination of the match between the one or more of the received replenishment service attributes and the one or more required replenishment service attributes of the mobile device.

34. The method of claim 33, further comprising the step of communicating information concerning a location of one or more replenishment devices and information concerning a location of the communication device between the service provider and the communication device.

35. The method of claim 34, wherein at least one of the communication device location information and the replenishment device location information is provided by a positioning service.

* * * * *